United States Patent
Mosley

[11] Patent Number: 6,024,512
[45] Date of Patent: Feb. 15, 2000

[54] OIL SLICK BARRIER DEVICE

[76] Inventor: Ira Wayne Mosley, 5856 Trotman Cir., Portsmouth, Va. 23703

[21] Appl. No.: 09/078,698

[22] Filed: May 14, 1998

[51] Int. Cl.[7] .................................................... E02B 15/04
[52] U.S. Cl. .............................................. 405/65; 405/63
[58] Field of Search ............................. 210/242.3, 242.1; 405/63, 65; 114/343, 382

[56] References Cited

U.S. PATENT DOCUMENTS

| | | | |
|---|---|---|---|
| 2,240,567 | 5/1941 | Meacham et al. | 405/65 |
| 3,146,598 | 9/1964 | Smith | 405/66 |
| 3,766,738 | 10/1973 | Gauch | 405/65 |
| 3,818,708 | 6/1974 | Benson | 405/65 |
| 3,970,341 | 7/1976 | Glanemann et al. | 294/64.1 |
| 3,973,406 | 8/1976 | Casey | 405/66 |
| 4,328,761 | 5/1982 | Dwyer | 114/222 |
| 5,004,372 | 4/1991 | Dickie et al. | 405/63 |
| 5,149,226 | 9/1992 | Antinoro et al. | 405/65 |

*Primary Examiner*—Eileen Dunn Lillis
*Assistant Examiner*—Frederick L. Lagman

[57] ABSTRACT

A new oil slick barrier device for preventing an oil slick on the surface of a body of water from spreading. The inventive device includes a pair of attachment members and a barrier member. Each attachment member is adapted for attachment to a surface. The elongate barrier member has a pair of opposite ends with one of the ends of the barrier member detachably attached to one of the attachment members and the other end of the barrier member detachable attached to the other attachment member. The barrier member is adapted for floating on the surface of a body of water to prevent oil on the surface of the body of water from passing through the barrier member.

18 Claims, 3 Drawing Sheets

OIL SLICK BARRIER DEVICE

BACKGROUND OF THE INVENTION

1. Field of the Invention

The present invention relates to oil slick barrier devices and more particularly pertains to a new oil slick barrier device for preventing an oil slick on the surface of a body of water from spreading.

2. Description of the Prior Art

The use of oil slick barrier devices is known in the prior art. More specifically, oil slick barrier devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art oil slick barrier devices include U.S. Pat. Nos. 5,216,973; U.S. Pat. No. 4,026,233; U.S. Pat. No. Des. 358,361; U.S. Pat. Nos. 4,802,514; U.S. Pat. No. 5,357,890; and U.S. Pat. No. 5,152,242.

While these devices fulfill their respective, particular objectives and requirements, the aforementioned patents do not disclose a new oil slick barrier device. The inventive device includes a pair of attachment members and a barrier member. Each attachment member is adapted for attachment to a surface. The elongate barrier member has a pair of opposite ends with one of the ends of the barrier member detachably attached to one of the attachment members and the other end of the barrier member detachable attached to the other attachment member. The barrier member is adapted for floating on the surface of a body of water to prevent oil on the surface of the body of water from passing through the barrier member.

In these respects, the oil slick barrier device according to the present invention substantially departs from the conventional concepts and designs of the prior art, and in so doing provides an apparatus primarily developed for the purpose of preventing an oil slick on the surface of a body of water from spreading.

SUMMARY OF THE INVENTION

In view of the foregoing disadvantages inherent in the known types of oil slick barrier devices now present in the prior art, the present invention provides a new oil slick barrier device construction wherein the same can be utilized for preventing an oil slick on the surface of a body of water from spreading.

The general purpose of the present invention, which will be described subsequently in greater detail, is to provide a new oil slick barrier device apparatus and method which has many of the advantages of the oil slick barrier devices mentioned heretofore and many novel features that result in a new oil slick barrier device which is not anticipated, rendered obvious, suggested, or even implied by any of the prior art oil slick barrier devices, either alone or in any combination thereof.

To attain this, the present invention generally comprises a pair of attachment members and a barrier member. Each attachment member is adapted for attachment to a surface. The elongate barrier member has a pair of opposite ends with one of the ends of the barrier member detachably attached to one of the attachment members and the other end of the barrier member detachable attached to the other attachment member. The barrier member is adapted for floating on the surface of a body of water to prevent oil on the surface of the body of water from passing through the barrier member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil slick barrier device apparatus and method which has many of the advantages of the oil slick barrier devices mentioned heretofore and many novel features that result in a new oil slick barrier device which is not anticipated, rendered obvious, suggested, or even implied by any of the prior art oil slick barrier devices, either alone or in any combination thereof.

It is another object of the present invention to provide a new oil slick barrier device which may be easily and efficiently manufactured and marketed.

It is a further object of the present invention to provide a new oil slick barrier device which is of a durable and reliable construction.

An even further object of the present invention is to provide a new oil slick barrier device which is susceptible of a low cost of manufacture with regard to both materials and labor, and which accordingly is then susceptible of low prices of sale to the consuming public, thereby making such oil slick barrier device economically available to the buying public.

Still yet another object of the present invention is to provide a new oil slick barrier device which provides in the apparatuses and methods of the prior art some of the advantages thereof, while simultaneously overcoming some of the disadvantages normally associated therewith.

Still another object of the present invention is to provide a new oil slick barrier device for preventing an oil slick on the surface of a body of water from spreading.

Yet another object of the present invention is to provide a new oil slick barrier device which includes a pair of attachment members and a barrier member. Each attachment member is adapted for attachment to a surface. The elongate barrier member has a pair of opposite ends with one of the ends of the barrier member detachably attached to one of the attachment members and the other end of the barrier member detachable attached to the other attachment member. The barrier member is adapted for floating on the surface of a body of water to prevent oil on the surface of the body of water from passing through the barrier member.

Still yet another object of the present invention is to provide a new oil slick barrier device that is attachable to a surface, such as the outer hull of a boat to either prevent an oil spill from the boat from spreading or to prevent a oil slick and other debris on a body of water from coming into contact with the outer hull of the boat.

Even still another object of the present invention is to provide a new oil slick barrier device that is easily attachable and easily removable from a surface so that the device can be quickly deployed in the event of an oil slick.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
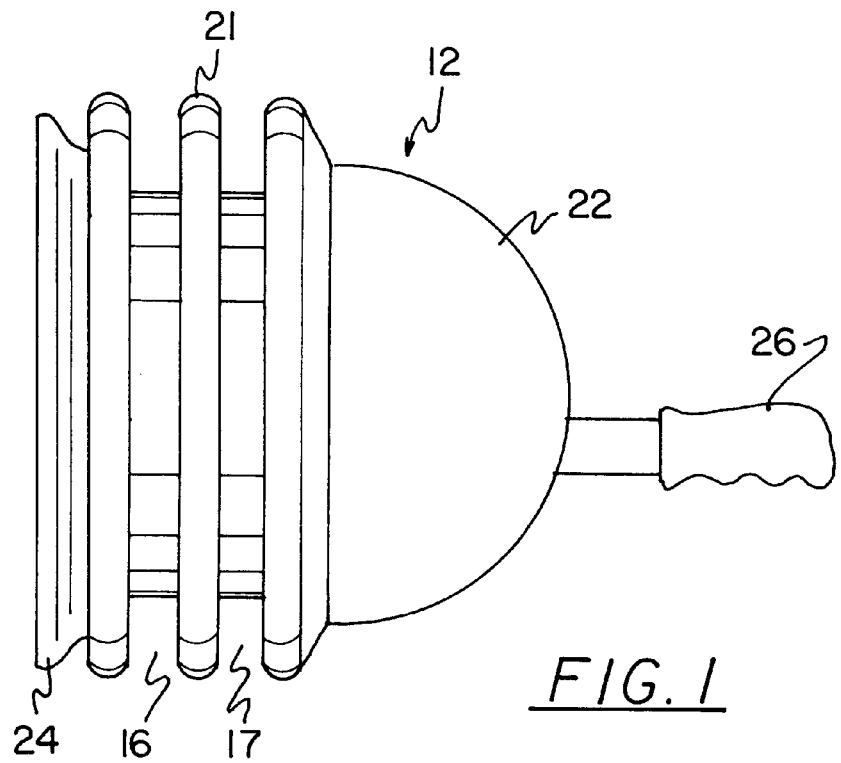
FIG. 1 is a schematic side view of an attachment member of a new oil slick barrier device according to the present invention.
Figure 2:
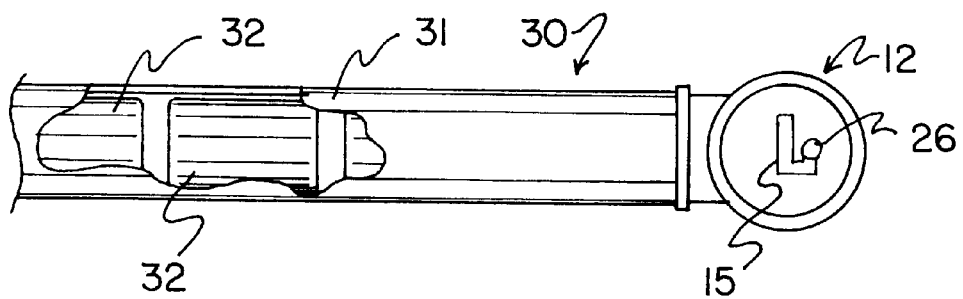
FIG. 2 is a schematic partial breakaway side view of the barrier member attached to one attachment member of the present invention.

With reference now to the drawings, and in particular to FIGS. 1 through 6 thereof, a new oil slick barrier device embodying the principles and concepts of the present invention and generally designated by the reference numeral 10 will be described.

As best illustrated in FIGS. 1 through 6, the oil slick barrier device 10 generally comprises a pair of attachment members 12,13 and a barrier member 30. Each attachment member is adapted for attachment to a surface. The elongate barrier member 30 has a pair of opposite ends with one of the ends of the barrier member 30 detachably attached to one of the attachment members 12 and the other end of the barrier member 30 detachable attached to the other attachment member 13. The barrier member 30 is adapted for floating on the surface of a body of water 2 to prevent oil 3 on the surface of the body of water from passing through the barrier member 30.

In use, the oil slick barrier device 10 is designed for mounting to a surface, such as the outer hull of a boat 1. The device 10 may be used to help contain oil slicks from the boat or to prevent an oil slick in a body of water from coming into contact with the hull. In closer detail, each the attachment member comprises a housing 20 having an interior, an outer surface, and opposite first and second ends. Preferably, the housing 20 has first and second portions 21,22. The first portion 21 is ideally generally cylindrical and the and is positioned towards the first end of the housing 20. The second portion 22 of the housing 20 is generally hemispherical and is positioned at the second end of the housing 20. The first end of the housing 20 has an opening 23 into the interior of the housing 20. A suction cup member 24 is coupled to the first end of the housing 20 to cover the opening 23 of the first end of the housing 20. The suction cup member 24 is adapted for attachment to a surface such as the outer hull of a boat 1.

Figure 6:
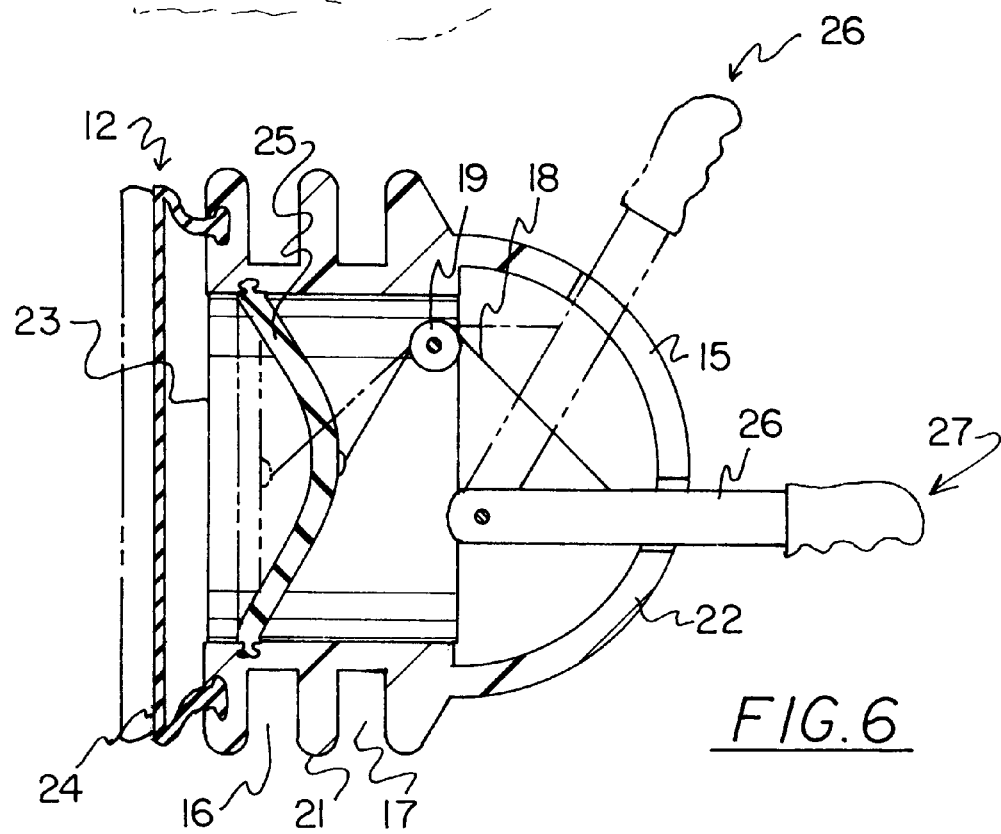
FIG. 6 is a schematic sectional view of the present invention as seen from line 6—6 of FIG. 4.

A diaphragm member 25 is provided in the interior of the housing 20 between the first and second ends of the housing 20 and adjacent the suction cup member 24. The diaphragm member 25 is also coupled to the housing 20. A lever 26 is pivotally coupled to the housing 20 and is outwardly extended from the second end of the housing 20 through a slot 15 in the second portion 22. The lever 26 is pivotable between an engaged position 27 and disengaged position 28. As illustrated in FIG. 6, the lever 26 is connected to the diaphragm member 25 by a line 18 and a pulley 19 such that a portion of the diaphragm member 25 is pulled towards the second end of the housing 20 when the lever 26 arm is pivoted from the disengaged position 28 towards the engaged position 27. The pulling of the diaphragm member 25 creates a negative pressure in the space between the suction cup member 24 and the diaphragm member 25 such that the suction cup member 24 is pulled back towards opening 23 of the first end of the housing 20 to suctionally attach it to a surface 1. The outer surface of the housing 20 also has a pair of annular channel 16,17 extending therearound. The channels 16,17 are positioned between the first and second ends of the housing 20 and preferably located on the first portion of the housing 20.

Preferably, the barrier member 30 comprises an elongate sheath member 31 which is generally tubular and has a lumen. The length of the sheath member 31 is extended between the ends of the barrier member 30. Preferably, the sheath member 31 is generally flexible and comprises an oil impermeable material to prevent oil 3 and other petrochemicals from passing through the barrier member 30 when in use. A plurality of floatation members 32 are provided in the lumen of the sheath member 31. Each of the floatation members 32 is generally cylindrical and is adapted for floatation on a body of water. The plurality of floatation members 32 are designed for providing flexibility to the barrier member 30. Preferably, the floatation members 32 comprise a foamed material such as Styrofoam.

Figure 3:
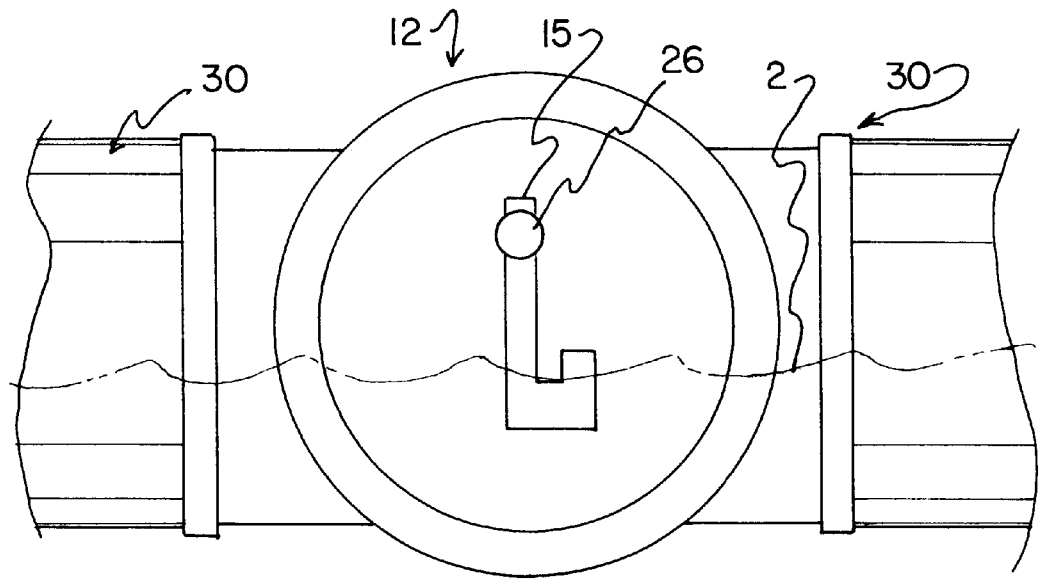
FIG. 3 is a schematic partial side view an attachment member having two ends of two barrier members of the present invention.
Figure 4:
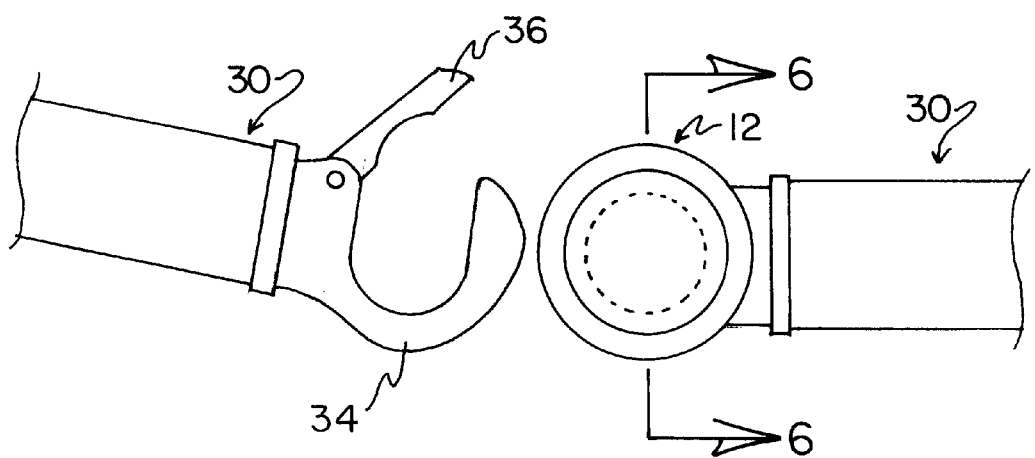
FIG. 4 is a schematic end side view of a hook of a barrier member of the present invention.
Figure 5:
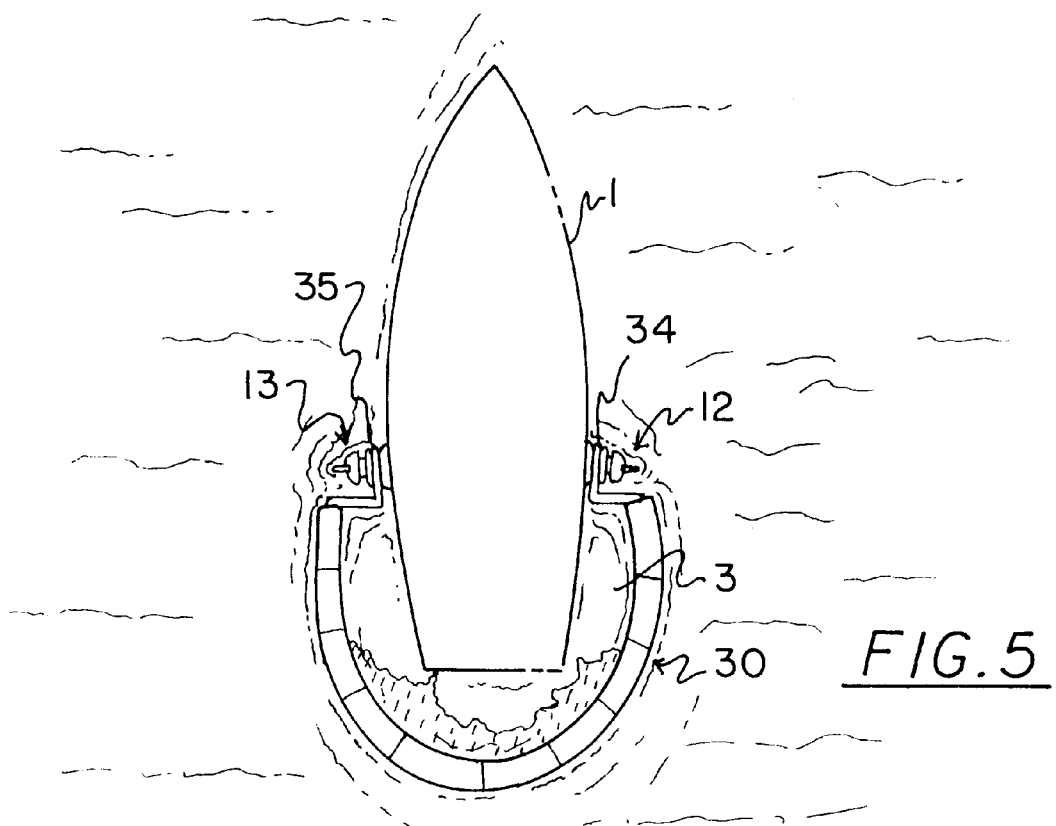
FIG. 5 is a schematic top view of the present invention in use attached to the hull of a boat.

Each of the ends of the barrier member 30 has a hook 34,35. Each hook 34,35 is insertable around into one of the annular channel 16,17 of an attachment member 12,13 such that the end of the barrier member 30 is attached to the attachment member. Each of the hooks 34,35 preferably has an attachment clasp 36 pivotally coupled to the base of the hook and extended across the space of the hook to the end of the hook. The attachment clasp 36 and hook encircle the annular channel to help hold the hook to the attachment member. As illustrated in FIG. 3, the hooks of two barrier members may be coupled to one attachment member to make a long chain of barrier members As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oil slick barrier device for mounting to a surface, comprising:
    a pair of attachment members each being adapted for attachment to a surface; and
    an elongate barrier member having a pair of opposite ends, one of said ends of said barrier member being detachably attached to one of said attachment members, another end of said barrier member being detachable attached to another of said attachment members, said barrier member being adapted for floating on the surface of a body of water to prevent oil on the surface of the body of water from passing through said barrier member;
    wherein each said attachment member comprises:
        a housing having an interior, an outer surface, and opposite first and second ends,
        said first end of said housing having an opening into said interior of said housing; and
        a suction cup member being coupled to said first end of said housing and covering said opening of said first end of said housing, said suction cup being adapted for attachment to the surface;
        wherein said outer surface of said housing has a pair of annular channels extending therearound, said channels being positioned between said first and second ends of said housing.

2. The device of claim 1, wherein said housing has first and second portions, said first portion of said housing being generally cylindrical and being positioned towards said first end of said housing, said second portion of said housing being generally hemispherical and being positioned at said second end of said housing.

3. The device of claim 1, further comprising a diaphragm member being provided in said interior of said housing between said first and second ends of said housing, said diaphragm member being coupled to said housing; and further comprising a lever arm being extended from said second end of said housing, said lever being pivotally coupled to said housing such that said lever is pivotable between an engaged position and disengaged position, said lever being connected to said diaphragm member such that a portion of said diaphragm is pulled towards said second end of said housing when said lever arm is pivoted from said disengaged position towards said engaged position.

4. The device of claim 1, wherein each of said ends of said barrier member has a hook, each hook being insertable into one of said annular channels of an attachment member such that the end of said barrier member is attached to the attachment member.

5. The device of claim 1, wherein said barrier member comprises:
    an elongate sheath member being generally tubular and having a lumen, and a length, said length of said sheath member being extended between said ends of said barrier member; and
    a plurality of floatation members being provided in said lumen of said sheath member, each of said floatation members being adapted for floatation on a body of water.

6. The device of claim 5, wherein said sheath member is generally flexible.

7. The device of claim 5, wherein said sheath member comprises an oil impermeable material.

8. The device of claim 5, wherein each of said floatation members is generally cylindrical.

9. The device of claim 5, wherein said floatation members comprise a foamed material.

10. An oil slick barrier device for mounting to a surface, comprising:
    a pair of attachment members each being adapted for attachment to a surface;
    an elongate barrier member having a pair of opposite ends, one of said ends of said barrier member being detachably attached to one of said attachment members, another end of said barrier member being detachable attached to another of said attachment members, said barrier member being adapted for floating on the surface of a body of water to prevent oil on the surface of the body of water from passing through said barrier member;
    wherein each said attachment member comprises:
        a housing having an interior, an outer surface, and opposite first and second ends, said housing having first and second portions, said first portion of said housing being generally cylindrical and being positioned towards said first end of said housing, said second portion of said housing being generally hemispherical and being positioned at said second end of said housing;
        said first end of said housing having an opening into said interior of said housing;
        a suction cup member being coupled to said first end of said housing and covering said opening of said first end of said housing, said suction cup being adapted for attachment to a surface;
        a diaphragm member being provided in said interior of said housing between said first and second ends of said housing, said diaphragm member being coupled to said housing;
        a lever being extended from said second end of said housing, said lever being pivotally coupled to said housing such that said lever is pivotable between an engaged position and disengaged position, said lever being connected to said diaphragm member such that a portion of said diaphragm is pulled towards said second end of said housing when said lever arm is pivoted from said disengaged position towards said engaged position; and said outer surface of said housing having a pair of annular channels extending therearound, said channels being positioned between said first and second ends of said housing and located on said first portion of said housing; and wherein said barrier member comprises:

an elongate sheath member being generally tubular and having a lumen, and a length, said length of said sheath member being extended between said ends of said barrier member, wherein said sheath member is generally flexible, wherein said sheath member comprises an oil impermeable material;

a plurality of floatation members being provided in said lumen of said sheath member, each of said floatation members being generally cylindrical and being adapted for floatation on a body of water, wherein said floatation members comprising a foamed material; and each of said ends of said barrier member having a hook, each hook being insertable into one of said annular channels of an attachment member such that the end of said barrier member is attached to the attachment member.

11. An oil slick barrier device for mounting to a surface, comprising:

a pair of attachment members each being adapted for attachment to a surface, wherein each said attachment member comprises:

a housing having an interior, an outer surface, and opposite first and second ends;

said first end of said housing having an opening into said interior of said housing; and a suction cup member being coupled to said first end of said housing and covering said opening of said first end of said housing, said suction cup being adapted for attachment to the surface;

an elongate barrier member having a pair of opposite ends, one of said ends of said barrier member being detachably attached to one of said attachment members, another end of said barrier member being detachable attached to another of said attachment members, said barrier member being adapted for floating on the surface of a body of water to prevent oil on the surface of the body of water from passing through said barrier member; and a diaphragm member being provided in said interior of said housing between said first and second ends of said housing, said diaphragm member being coupled to said housing; and further comprising a lever arm being extended from said second end of said housing, said lever being pivotally coupled to said housing such that said lever arm is pivotable between an engaged position and disengaged position, said lever being connected to said diaphragm member such that a portion of said diaphragm is pulled towards said second end of said housing when said lever arm is pivoted from said disengaged position towards said engaged position.

12. The device of claim 11, wherein said outer surface of said housing has a pair of annular channels extending therearound, said channels being positioned between said first and second ends of said housing.

13. The device of claim 11, wherein said housing has first and second portions, said first portion of said housing being generally cylindrical and being positioned towards said first end of said housing, said second portion of said housing being generally hemispherical and being positioned at said second end of said housing.

14. The device of claim 11, wherein said barrier member comprises:

an elongate sheath member being generally tubular and having a lumen, and a length, said length of said sheath member being extended between said ends of said barrier member; and a plurality of floatation members being provided in said lumen of said sheath member, each of said floatation members being adapted for floatation on a body of water.

15. The device of claim 11, wherein said sheath member is generally flexible.

16. The device of claim 11, wherein said sheath member comprises an oil impermeable material.

17. The device of claim 11, wherein each of said floatation members is generally cylindrical.

18. The device of claim 11, wherein said floatation members comprise a foamed material.

* * * * *